(12) United States Patent
Tokiwa

(10) Patent No.: US 11,338,546 B2
(45) Date of Patent: May 24, 2022

(54) SKIN-COVERED FOAMED MOLDED ARTICLE

(71) Applicant: JSP CORPORATION, Tokyo (JP)

(72) Inventor: Tomoo Tokiwa, Kanuma (JP)

(73) Assignee: JSP CORPORATION, Tokyo (JP)

( * ) Notice: Subject to any disclaimer, the term of this patent is extended or adjusted under 35 U.S.C. 154(b) by 322 days.

(21) Appl. No.: 16/645,420

(22) PCT Filed: Sep. 14, 2018

(86) PCT No.: PCT/JP2018/034313
§ 371 (c)(1),
(2) Date: Mar. 6, 2020

(87) PCT Pub. No.: WO2019/059142
PCT Pub. Date: Mar. 28, 2019

(65) Prior Publication Data
US 2020/0282695 A1     Sep. 10, 2020

(30) Foreign Application Priority Data

Sep. 25, 2017   (JP) .............................. JP2017-183754

(51) Int. Cl.
*B32B 5/24* (2006.01)
*B29B 11/06* (2006.01)
(Continued)

(52) U.S. Cl.
CPC .............. *B32B 5/245* (2013.01); *B29B 11/06* (2013.01); *B29B 11/16* (2013.01); *B29C 44/14* (2013.01);
(Continued)

(58) Field of Classification Search
CPC ......... B32B 5/245; B32B 27/20; B32B 27/32; B32B 2262/101; B29B 11/06;
(Continued)

(56) References Cited

U.S. PATENT DOCUMENTS

| 5,366,674 A | 11/1994 | Hattori et al. |
| 6,153,683 A * | 11/2000 | Enomoto ................. C08K 7/06 |
| | | 524/495 |

(Continued)

FOREIGN PATENT DOCUMENTS

| EP | 0 669 195 A1 | 8/1995 |
| JP | S59-145125 A | 8/1984 |

(Continued)

OTHER PUBLICATIONS

Dec. 18, 2018 International Search Report issued in International Patent Application No. PCT/JP2018/034313.

(Continued)

*Primary Examiner* — Tamra L. Dicus
(74) *Attorney, Agent, or Firm* — Oliff PLC

(57) ABSTRACT

A skin-covered foamed molded article having excellent lightweight property, bending rigidity, and favorable dimensional stability, which includes: a skin material composed of a hollow molded body produced by blow-molding an extruded parison; and an expanded bead molded article located inside the skin material, wherein the skin material has an average wall thickness of from 1.0 mm to 5.0 mm, the skin material includes a glass fiber-reinforced polypropylene-based resin containing glass fiber in a range of from 5 mass % to 30 mass %, the glass fiber has a weight-average fiber length of from 0.4 mm to 1.5 mm, the expanded bead molded article includes a polypropylene-based resin, the peeling strength between the skin material and the expanded bead molded article is 0.1 MPa or higher, and the longitudinal linear expansion coefficient of the skin-covered foamed molded article (100) at from 23° C. to 80° C. is $7 \times 10^{-5}$/° C. or lower.

5 Claims, 1 Drawing Sheet

(51) Int. Cl.
  *B29B 11/16* (2006.01)
  *B29C 44/14* (2006.01)
  *B29C 44/44* (2006.01)
  *B32B 27/20* (2006.01)
  *B32B 27/32* (2006.01)
  *C08J 9/00* (2006.01)
  *C08J 9/228* (2006.01)
  *B29K 23/00* (2006.01)
  *B29K 309/08* (2006.01)
  *B29L 9/00* (2006.01)

(52) U.S. Cl.
  CPC ............ *B29C 44/445* (2013.01); *B32B 27/20* (2013.01); *B32B 27/32* (2013.01); *C08J 9/0085* (2013.01); *C08J 9/228* (2013.01); *B29K 2023/12* (2013.01); *B29K 2309/08* (2013.01); *B29L 2009/00* (2013.01); *B32B 2262/101* (2013.01); *C08J 2323/08* (2013.01); *C08J 2323/12* (2013.01); *C08J 2323/14* (2013.01)

(58) Field of Classification Search
  CPC ....... B29B 11/16; B29C 44/14; B29C 44/445; C08J 9/0085; C08J 9/228; C08J 2323/08; C08J 2323/12; C08J 2323/14; B29K 2023/12; B29K 2309/08; B29L 2009/00
  See application file for complete search history.

(56) References Cited

U.S. PATENT DOCUMENTS

| | | |
|---|---|---|
| 2008/0275148 A1 | 11/2008 | Tokiwa et al. |
| 2015/0008607 A1 | 1/2015 | Tokiwa |
| 2015/0174812 A1* | 6/2015 | Tokiwa ............... B29C 49/46 |
| | | 264/46.6 |

FOREIGN PATENT DOCUMENTS

| | | |
|---|---|---|
| JP | H08-085156 A | 4/1996 |
| JP | 2860007 B2 | 2/1999 |
| JP | 2004-249558 A | 9/2004 |
| JP | 2008-273117 A | 11/2008 |
| JP | 2010-082941 A | 4/2010 |
| JP | 2011-067957 A | 4/2011 |
| JP | 2015-013450 A | 1/2015 |
| JP | 2016-088052 A | 5/2016 |
| JP | 2018-001493 A | 1/2018 |
| WO | 2010/032394 A1 | 3/2010 |
| WO | 2018/180678 A1 | 10/2018 |

OTHER PUBLICATIONS

Mar. 31, 2020 International Preliminary Report on Patentability issued in International Patent Application No. PCT/JP2018/034313.

* cited by examiner

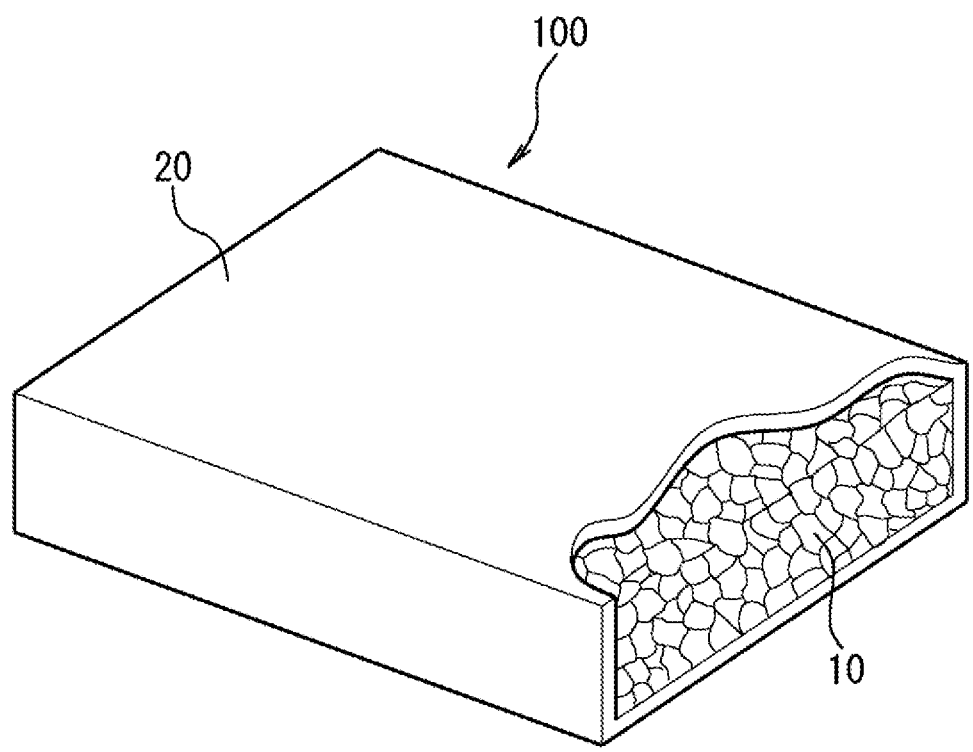

SKIN-COVERED FOAMED MOLDED ARTICLE

TECHNICAL FIELD

The present invention relates to a skin-covered foamed molded article including a skin material composed of a hollow molded body formed by blow molding and a foamed molded article of expanded beads located inside the skin material, and particularly to a skin-covered foamed molded article that weighs light, excels in bending rigidity, and exhibits favorable dimensional stability.

BACKGROUND ART

Conventionally, various skin-covered foamed molded articles have been disclosed that are produced by: creating a hole in a hollow molded body formed by blow molding; filling a hollow portion of the hollow molded body with thermoplastic resin expanded beads; and heating and fusing the thermoplastic resin expanded beads.

For instance, Patent Literature 1 discloses a technology in which when expanded beads are filled into a hollow molded body (skin material) formed by blow molding, a hole is created on the hollow molded body, the inside of the hollow molded body is opened to the air, and steam for heating is supplied to heat and fuse the expanded beads. The above technology makes it possible to produce a skin-covered foamed molded article.

The above-mentioned skin-covered foamed molded article can be manufactured through a series of steps including: forming a skin material by blow molding; and subsequently filling expanded beads into the inside of the skin material to produce an expanded bead molded article. Because of this, the skin-covered foamed molded article excels in molding cycle, has favorable adhesion between the skin material and the expanded bead molded article, and also has superior bending rigidity. In addition, for the skin-covered foamed molded article, the skin material and the expanded bead molded article are produced through a series of steps in the same mold. Hence, it is possible to produce not only simple plate-shaped moldings but also moldings with desired complex shapes. Such a skin-covered foamed molded article is applicable to various members used for motor vehicles, industrial purposes, agricultural purposes, medical purposes, or nursing care purposes.

CITATION LIST

Patent Literature

Patent Literature 1: Japanese Patent No. 2860007

SUMMARY OF INVENTION

Technical Problem

Meanwhile, resin members have recently been used for various members of motor vehicles. Resin members used for vehicle exterior materials tend to require better lightweight property, higher bending rigidity, and a smaller rate of dimensional change in response to a temperature change. Generally speaking, resin members are likely to have a larger rate of dimensional change in response to a temperature change than metal members. Expanded bead molded article are each used as a core of each skin-covered foamed molded article, in particular, and the skin-covered foamed molded article tends to have a larger rate of dimensional change in response to a temperature change than general-purpose non-foamed resin members because of, for instance, thermal expansion of the expanded bead molded article. Accordingly, when the skin-covered foamed molded article is used as a vehicle exterior material, dimensional stability in response to a temperature change should be improved. Further, although the rate of dimensional change is the same, each long skin-covered foamed molded article with a length of more than 1 m has a larger absolute value for the dimensional change. Accordingly, when such a long skin-covered foamed molded article is used as a vehicle exterior material, dimensional stability in response to a temperature change should be improved further. Furthermore, to increase bending rigidity of the skin-covered foamed molded article, a technique for thickening the thickness of a skin material has been typically implemented. However, this case does not necessarily comply with the requirement of lightweight property needed for vehicle exterior materials.

The present invention has been made in view of the above situations, and an object of the present invention is to provide a skin-covered foamed molded article that weighs light but still has excellent bending rigidity and favorable dimensional stability in response to a temperature change.

Solution to Problem

A skin-covered foamed molded article of the invention is a skin-covered foamed molded article including: a skin material composed of a hollow molded body; and an expanded bead molded article located inside the skin material, wherein the skin material has an average wall thickness of from 1.0 mm to 5.0 mm, the skin material includes a glass fiber-reinforced polypropylene-based resin including glass fiber in a range of from 5 mass % to 30 mass %, the glass fiber has a weight-average fiber length of from 0.4 mm to 1.5 mm, the expanded bead molded article includes a polypropylene-based resin, a peeling strength between the skin material and the expanded bead molded article is 0.1 MPa or higher, and a longitudinal linear expansion coefficient of the skin-covered foamed molded article at from 23° C. to 80° C. is $7 \times 10^{-5}$/° C. or lower.

Advantageous Effects of Invention

A skin-covered foamed molded article of the invention excels in lightweight property because the average wall thickness of its skin material is from 1.0 mm to 5.0 mm. The skin material includes a fiber-reinforced polypropylene-based resin containing 5 mass % to 30 mass % of glass fiber, the glass fiber has a weight-average fiber length of from 0.4 mm to 1.5 mm, and the peeling strength between the skin material and an expanded bead molded article is 0.1 MPa or higher. Consequently, the skin-covered foamed molded article of the invention excels in bending rigidity while the skin material is thin as well as has excellent dimensional stability in response to a temperature change. In the above excellent quality skin-covered foamed molded article of the invention, the dimensional change is suppressed even if the size in a longitudinal direction exceeds 1 m. Hence, the skin-covered foamed molded article of the invention can be favorably used as vehicle exterior material.

BRIEF DESCRIPTION OF DRAWINGS

FIG. 1 is a perspective view illustrating a skin-covered foamed molded article according to the present invention.

DESCRIPTION OF EMBODIMENTS

A skin-covered foamed molded article of the invention (hereinafter, also simply referred to as a foamed molded article) includes: a skin material composed of a hollow molded body produced by blow-molding an extruded parison; and an expanded bead molded article located inside the skin material. In the foamed molding of the invention, the skin material and the expanded bead molded article are fused. The skin material in the invention includes a glass fiber-reinforced polypropylene-based resin containing glass fiber. The glass fiber has a weight-average fiber length in a specific range. The average wall thickness of the skin material is adjusted to from 1.0 mm to 5.0 mm. The expanded bead molded article in the invention includes a polypropylene-based resin. In the invention, the peeling strength between the skin material and the expanded bead molded article is 0.1 MPa or higher.

The foamed molded article of the invention excels in lightweight property because the thickness of the skin material is thin and is within a prescribed range as described above. In addition, the foamed molded article of the invention excels in productivity because the skin material and the expanded bead molded article covered with the skin material are formed through a series of molding steps.

The skin material in the invention includes a glass fiber-reinforced polypropylene-based resin. In the above glass fiber-reinforced polypropylene-based resin, the content of glass fiber having a weight-average fiber length of from 0.4 mm to 1.5 mm ranges from 5 mass % to 30 mass % with respect to 100 mass % of the glass fiber-reinforced polypropylene-based resin. This makes it possible to make the linear expansion coefficient of the foamed molded article of the invention smaller than those of conventional skin-covered foamed molded articles. Specifically, the longitudinal linear expansion coefficient of the foamed molded article of the invention at from 23° C. to 80° C. is $7 \times 10^{-5}$/° C. or lower. In the foamed molded article of the invention, the linear expansion coefficient is so improved and the dimensional stability in response to a temperature change is thus excellent. Accordingly, the difference in linear expansion coefficient between the foamed molded article of the invention and each metal member is made smaller even when the foamed molded article is used, together with the metal member, for applications, such as vehicle exterior materials, under a stringent thermal environment. As a result, the foamed molded article of the invention also excels in mounting strength to the vehicle body.

In addition, in the foamed molded article of the invention, the content and the fiber length of the glass fiber in the skin material is specified in prescribed ranges. In the foamed molded article according to the invention, care is provided such that this does not cause a decrease in peeling strength between the skin material and the expanded bead molded article due to inclusion of the glass fiber in the skin material. Hence, the foamed molded article of the invention excels in peeling strength between the skin material and the expanded bead molded article, like conventional skin-covered foamed molded articles having a glass fiber-free skin material. The foamed molded article of the invention includes a skin material and a expanded bead molded article that are bonded with such a favorable peeling strength as well as can exhibit superior bending rigidity because the skin material contains glass fiber. In the following, the foamed molded article of the invention will be described in detail.

(Skin Material)

The skin material in the invention is a hollow molded body in which an expanded bead molded article is located. For instance, as illustrated in below-described FIG. 1, the expanded bead molded article is covered with the skin material in the invention. It is preferable that substantially the entire surface of the expanded bead molded article is covered with the skin material. Provided that the invention encompasses an aspect in which a foamed molded article produced by covering substantially the entire surface of an expanded bead molded article with a skin material is cut, if appropriate, and the expanded bead molded article is exposed at the cutting surface. In addition, plural molding traces formed during molding steps may remain on the skin material. However, at the molding traces, the expanded bead molded article is not necessarily covered with the skin material. Examples of the molding traces include: filling holes formed so as to fill expanded beads into the skin material; and steam pin insertion sites formed so as to insert steam pins in the skin material.

The hollow molded body in the invention means a molded body formed by blow-molding an extruded parison. The hollow molded body is formed by blow molding to be hollowed. Then, its inside is rapidly filled with expanded beads to yield an expanded bead molded article. Due to this, in the foamed molded article, the inside of the hollow molded body is tightly filled with the expanded bead molded article.

The skin material in the invention includes a glass fiber-reinforced polypropylene-based resin. That is, the skin material includes a polypropylene-based resin and glass fiber. The polypropylene-based resin refers to a resin having a propylene-derived constitutional unit as a main constitutional unit. Here, the main constitutional unit means a constitutional unit, the content of which is more than 50 mass % in 100 mass % of a polymer. Examples of the structure of the polypropylene-based resin may include, but are not limited to, any of a propylene homopolymer, or a random copolymer or block copolymer of propylene and another monomer(s). Further, the polypropylene-based resin may be high-impact polypropylene (what is called block polypropylene) in which ethylene-propylene-based copolymer rubber or polyethylene and ethylene-propylene-based copolymer rubber is dispersed into the homopolymer, the random copolymer, or the block polymer.

It is preferable that a base resin of the above glass fiber-reinforced polypropylene-based resin consists of a polypropylene-based resin. Nevertheless, the glass fiber-reinforced polypropylene-based resin may contain, without departing from the scope of the invention, an additional polymer(s) other than the polypropylene-based resin. Example of the additional polymer(s) include thermoplastic resins other than the polypropylene-based resin, and thermoplastic elastomers. The blending ratio of the additional polymer(s) is preferably 10 parts by mass or less and more preferably 5 parts by mass or less with respect to 100 parts by mass of the polypropylene-based resin.

In the invention, the glass fiber included in the glass fiber-reinforced polypropylene-based resin constituting the skin material is a kind of what is called reinforced fiber, which is a fibrous material having glass as a main component. The glass fiber contains, for instance, silicon dioxide as a main component and may contain any other component(s) (for example, calcium oxide, magnesium oxide, and/or aluminum oxide).

The content of the glass fiber ranges from 5 mass % to 30 mass % in 100 mass % of the glass fiber-reinforced polypropylene-based resin. If the content of the glass fiber is less than 5 mass %, it is difficult to control the linear expansion coefficient of the foamed molded article to a prescribed value or less and to significantly increase the bending rigidity of the foamed molded article. In addition, by setting the content of the glass fiber to 30 mass % or less, the peeling strength between the skin material and the expanded bead molded article becomes sufficient. From the above viewpoints, the content of the glass fiber in the glass fiber-reinforced polypropylene-based resin is preferably 7 mass % or higher, more preferably 9 mass % or higher, and still more preferably 12 mass % or higher or preferably 26 mass % or lower, more preferably 25 mass % or lower, and still more preferably 22 mass % or lower.

For instance, the skin material in the invention preferably includes a glass fiber-reinforced polypropylene-based resin in which the content of the glass fiber ranges from 12 mass % to 25 mass %.

In the invention provided with the skin material containing glass fiber in the above range, a deflection load, in particular, can be favorably controlled. More specifically, when the content of the glass fiber in the skin material is 12 mass % or more, it is possible to control the 5-mm deflection load of the foamed molded article of the invention to 900 N or higher or even 1000 N or higher. In addition, by setting the content of the glass fiber to 25 mass % or less, it is easy to control the peeling strength between the skin material and the expanded bead molded article to 0.2 MPa or higher.

The glass fiber has a weight-average fiber length of from 0.4 mm to 1.5 mm. In the foamed molded article of the invention, the skin material includes glass fiber having a weight-average fiber length in the above range, therefor the skin material and the expanded bead molded article adhere well and favorable dimensional stability in response to a temperature change is showed. That is, when the weight-average fiber length of the glass fiber blended in the skin material is too short, the effect of suppressing a dimensional change in response to a temperature change in the foamed molded article is not significantly obtained. Meanwhile, when the weight-average fiber length of the glass fiber is too long, the effect of suppressing a dimensional change in response to a temperature change tends to decrease. From the above viewpoints, the weight-average fiber length is preferably 0.5 mm or longer and more preferably 0.6 mm or longer or preferably 1.4 mm or shorter and more preferably 1.3 mm or shorter.

In addition, blending, in the skin material, glass fiber with a weight-average fiber length of 1.5 mm or shorter prevents a parting line crack on the skin material and causes superior hole openability when a pin such as a steam pin is inserted into the skin material. This results in better adhesion between the skin material and the expanded bead molding. In addition, when the above weight-average fiber length exceeds 1.5 mm, rough surface like a fuzz appears on the outer surface of the skin material of the foamed molded article, and a surface property problem such as poor surface smoothness may occur. However, in the foamed molded article of the invention, such a surface property problem is avoided.

The method for adjusting the weight-average fiber length of glass fiber included in the skin material is not particularly limited. For instance, the weight-average fiber length of the glass fiber may be desirably adjusted by kneading, using an extruder for skin material formation, commercially available glass fiber and polypropylene-based resin, commercially available glass fiber-containing polypropylene-based resin, or commercially available glass fiber-containing polypropylene-based resin and polypropylene-based resin. Shearing during extrusion causes glass fiber to be crushed, resulting in a change in the weight-average fiber length of the glass fiber between before and after the extrusion. Thus, when the foamed molded article is manufactured, it is necessary prior to the manufacture that a raw material resin is beforehand extruded under the same conditions as at the time of manufacture to produce only a skin material and the weight-average fiber length of the post-extrusion glass fiber is then checked. In addition, if appropriate, by using the raw material which prepared by kneading with an extruder and re-kneaded one or two or more times with the extruder, the weight-average fiber length to within a desired range may be adjusted.

In the invention, the average wall thickness of the skin material is from 1.0 mm to 5.0 mm. The skin material in the invention includes a glass fiber-reinforced polypropylene-based resin. Consequently, when the average wall thickness is 1.0 mm or more, the bending rigidity of the foamed molded article can be significantly enhanced and the surface smoothness of the foamed molded article is easily made better. From the above viewpoints, the average wall thickness is preferably 1.2 mm or longer, more preferably 1.5 mm or longer, and still more preferably 2.0 mm or longer. In addition, when the average wall thickness is 5.0 mm or shorter, the foamed molded article can be made lightweight. From the above viewpoints, the average wall thickness is preferably 4.5 mm or shorter, more preferably 4.0 mm or shorter, and still more preferably 3.5 mm or shorter.

The skin material in the foamed molded article of the invention contains glass fiber and thus has an increased flexural modulus compared to glass fiber-free skin materials in conventional skin-covered foamed molded articles. The flexural modulus of the skin material in a longitudinal direction is preferably 1000 MPa or higher, more preferably 1300 MPa or higher, and still more preferably 1400 MPa or higher. The flexural modulus of the skin material in a lateral direction is preferably 1000 MPa or higher, more preferably 1100 MPa or higher, and still more preferably 1200 MPa or higher. The upper limit of each flexural modulus is not particularly limited and is, for instance, about 5000 MPa.

The partial heat fusion ($\Delta Hp$) in the range of 80° C. to 140° C. in the heat flux differential scanning calorimetry of the glass fiber reinforced polypropylene resin constituting the skin material is preferably 10 J/g or higher, more preferably 20 J/g or higher, and still more preferably 30 J/g or higher, and the upper limit is, for instance, 70 J/g. In addition, the ratio ($\Delta Hp/\Delta Ht$) of partial heat of fusion ($\Delta Hp$) to total heat of fusion ($\Delta Ht$) with regard to the above glass fiber-reinforced polypropylene-based resin is preferably 0.10 or higher, more preferably 0.14 or higher, still more preferably 0.20 or higher, and particularly preferably 0.40 or higher. In the heat-flux differential scanning calorimetry, when determining the heat of fusion of the glass fiber-reinforced polypropylene-based resin, 80° C. is suitable as the starting point of the baseline from which the heat can be determined with good reproducibility, therefore a starting point of a baseline is 80° C. in this invention. The partial heat of fusion ($\Delta Hp$) in a temperature range from 80° C. to 140° C. is based on 80° C., which is a starting point of a baseline, and 140° C., which value is close to a molding temperature of the polypropylene-based resin expanded beads during formation of the foamed molded article.

Preferable embodiments regarding the orientation of the glass fiber included in the skin material will be explained.

In the invention, it is preferable that the percentage of glass fiber oriented at an orientation angle in a range of 45 degrees or less with reference to a reference line, which is a line along an extrusion direction in in-plane directions of the skin material, with respect to the glass fiber present on the inner surface side of the skin material is 80% or higher on the number basis. The inner surface side of the skin material herein refers to the expanded bead molded article-facing side of the skin material. The glass fiber present on the inner surface side of the skin material refers to glass fiber present on from the inner surface to a portion within about 2% of the wall thickness in the wall thickness direction. In addition, the extrusion direction refers to a parison extrusion direction during formation of the hollow molded body.

Generally speaking, the peeling strength between the skin material and the expanded bead molded article is likely to be smaller as the wall thickness of the skin material becomes thinner. The skin material in the invention has an average wall thickness of from 1.0 mm to 5.0 mm, which is thin. Then, when the percentage of glass fiber oriented at an orientation angle in the above range with respect to the glass fiber included in the skin material in the invention is adjusted to 80% or higher, it is possible to easily control the peeling strength between the skin material and the expanded bead molded article to a sufficient value (e.g., 0.1 MPa or higher).

Note that the range of 45 degrees or less with reference to a reference line means, in total, the range of 90 degrees including the range of 45 degrees or less rightwards and the range of 45 degrees or less leftwards relative to the reference line as a center axis. The same applies to the following angle ranges.

In the invention, it is preferable that the percentage of glass fiber oriented at an orientation angle in a range of 45 degrees or less with reference to a reference line, which is a line along an extrusion direction in in-plane directions of the skin material, with respect to the glass fiber present on the outer surface side of the skin material is 80% or higher on the number basis. The outer surface side of the skin material herein refers to the side opposite to the inner surface side of the skin material. The glass fiber present on the outer surface side of the skin material refers to glass fiber present on from the outer surface to a portion within about 2% of the wall thickness in the wall thickness direction. The extrusion direction is the same as above.

Generally speaking, when the skin material contains a significant amount of glass fiber, the bending rigidity of the foamed molded article can be enhanced but the surface smoothness may be damaged. The skin material in the invention contains glass fiber in a range of from 5 mass % to 30 mass %. Then, the orientation angle of the glass fiber present on the outer side surface may be adjusted to the above range to provide a foamed molded article with favorable surface property.

Next, how glass fiber present in a middle portion in the wall thickness direction of the skin material is oriented will be described. The middle portion in the wall thickness direction herein means a portion at about a half distance in the wall thickness direction within the hollow molded body wall (i.e., the skin material). The following illustrates how the examined glass fiber is oriented after a cutting surface formed by slicing the hollow molded body in an in-plane direction at a middle portion in the wall thickness direction.

It is preferable that in in-plane directions of the skin material, the below-described percentage I of glass fiber present at the middle portion in the wall thickness direction of the skin material is 40% or higher on the number basis, the below-described percentage II is from 20% to 50% on the number basis, and the sum of the percentage I and the percentage II is 80% or higher. The percentage I is preferably 80% or lower.

The percentage I means the percentage of glass fiber oriented at an orientation angle in a range of 10 degrees or less with reference to an extrusion direction in in-plane directions of the hollow molded body with respect to the glass fiber present at the middle portion in the wall thickness direction. In addition, the above percentage II means the percentage of glass fiber oriented at an orientation angle in a range of from more than 10 degrees to 45 degrees with reference to an extrusion direction in in-plane directions of the hollow molded body.

In an aspect where the orientation of the glass fiber present at the middle portion in the wall thickness direction of the skin material satisfies the above range, torsional rigidity is increased and thus preferable. The foamed molded article of the invention as formed using a hollow molded body satisfying the above glass fiber percentage ranges excels in torsional rigidity even if the foamed molded article is a long product with a length of 1 m or longer, and is thus suited for, for instance, vehicle exterior materials.

Meanwhile, generally speaking, when a parison is blow-molded to give a hollow molded body (skin material), by inclusion of reinforced fiber in the parison, the parison has poor expandability. Thus when blow ratio of the parison increase at blow molding, the parison may burst during blow molding and a good hollow molded body may not be obtained. As a result, a favorable hollow molded body is unlikely to be obtained. Although the skin material in the invention contains glass fiber, the length and the content of the fiber is restricted to prescribed ranges. This prevents a parison rapture during blow molding in the invention.

The blow ratio representing the parison widthwise expansion in the invention means the ratio (Lc/La) of the maximum circumference (Lc) of the blown-up parison to the circumference (La) of a die lip part.

The skin material in the invention may be a foamed body or non-foamed body. From the viewpoint of appearance design and so on, a non-foamed body is preferred.

(Expanded Bead Molded Article)

Next, an expanded bead molded article in the skin-covered foamed molded article of the invention will be described. The expanded bead molded article in the invention is located inside the above-described skin material and includes polypropylene-based resin expanded beads (simply sometimes referred to as expanded beads in the following description). The base resin constituting the expanded bead molded article is preferably a polypropylene-based resin alone but may contain, in addition to the polypropylene-based resin, another polymer(s) to an extent without departing from the scope of the invention. Regarding the base resin constituting the expanded bead molded article and the polypropylene-based resin, descriptions about the base resin in the above-described skin material and the polypropylene-based resin can be consulted, if appropriate. Thus, the detailed description is herein partly omitted.

An apparent density of the expanded bead molded article is preferably from 20 kg/m$^3$ to 60 kg/m$^3$. If the apparent density is 20 kg/m$^3$ or higher, the expanded bead molded article dose not excessively shrink when removed from a mold and then cooled. If the apparent density is 60 kg/m$^3$ or lower, favorable lightweight property is kept. From such viewpoints, the apparent density is more preferably from 25 kg/m$^3$ to 50 kg/m$^3$.

To an extent without departing from the scope of the invention, the skin material and the expanded bead molded article may contain an additive(s) such as an antioxidant, a UV inhibitor, a colorant, an antistatic agent, a flame retardant, a flame retardant aid, a metal inactivator, a conductive filler. In addition, the expanded bead molded article may include a cell controlling agent.

(Skin-Covered Foamed Molded Article)

A skin-covered foamed molded article of the invention (foamed molded article) has a linear expansion coefficient of $7 \times 10^{-7}$° C. or less in longitudinal direction of the foamed molded article. The linear expansion coefficient herein refers to a rate of length change in response to a temperature change. From the viewpoint where as the linear expansion coefficient is smaller, the dimensional change in response to a temperature change is smaller and preferable, the lower limit of the linear expansion coefficient in the invention is not particularly limited. In this regard, however, the lower limit of the linear expansion coefficient is approximately $3 \times 10^{-7}$° C. Note that the longitudinal direction of the foamed molded article according to the invention means a longitudinal direction that can be recognized from the size of manufactured foamed molded article with any shape. The longitudinal direction of the foamed molded article according to the invention corresponds or substantially corresponds to a parison extrusion direction during formation of the skin material included in the foamed molded article. Thus, when the longitudinal side and the lateral side of the foamed molded article are indefinite in view of the shape, it may be possible that the extrusion direction is set to the longitudinal direction and the linear expansion coefficient is then measured. As description about the longitudinal direction of the skin material included in the foamed molded article, the above description about the longitudinal direction of the foamed molded article is referred to. In the foamed molded article of the invention, it is preferable that the length in the longitudinal direction is 1.2 times or more the length in the lateral direction.

In the foamed molded article of the invention, even if the skin material contains glass fiber, the skin material and the expanded bead molded article are favorably bonded. Specifically, the peeling strength between the expanded bead molded article and the skin material is 0.1 MPa or higher, preferably 0.20 MPa or higher, and more preferably 0.25 MPa or higher. If the peeling strength is too low, the skin material and the expanded bead molded article are peeled from each other at the initial stage when the foamed molded article is bent and as a result of which the bending rigidity is insufficient. The upper limit of the peeling strength is not particularly limited and is about 0.8 MPa. A specific procedure for measuring the peeling strength is illustrated in the below-described Examples.

An apparent density of the foamed molded article of the invention is preferably from 20 kg/m³ to 60 kg/m³. When the apparent density is within the above range, the foamed molded article has an excellent balance between lightweight property and rigidity.

(Method of Producing Skin-Covered Foamed Molded Article)

Next, an example of a method of producing a foamed molded article according to the invention will be described. A skin-covered foamed molded article of the invention may be produced by blow-molding a parison composed of a polypropylene-based resin containing glass fiber, filling a hollow portion of a formed hollow molded body composed of a glass fiber-reinforced polypropylene-based resin with polypropylene-based resin expanded beads, heating and fusion-bonding the expanded beads to form a expanded bead molded article and, at the same time, heating and fusion-bonding the expanded bead molded article and the inner circumferential surface of the hollow molded body in this way. In this regard, however, the below-indicated production method may be partly modified without departing from the scope of the invention.

Regarding the below-described raw material used for producing a foamed molded article according to the invention, the form of glass fiber is not particularly limited and it is possible to, for instance, beforehand prepare a glass fiber-containing polypropylene-based resin pellet.

First, an extruder is used to make a polypropylene-based resin molten and the polypropylene-based resin and glass fiber are kneaded to form a molten resin composition including the polypropylene-based resin and the glass fiber. This molten resin composition is made to pass through a die of an extruder and is extruded between split molds positioned immediately below the die to form a parison. Next, the split molds are closed and the parison is thus sandwiched between the molds. Then, the parison is blow-molded in the split molds to form a skin material comprising a hollow molded body composed of a glass fiber-reinforced polypropylene-based resin.

The mold temperature of the above split molds is preferably adjusted to within a range of from 40° C. to 90° C. When the mold temperature is 40° C. or higher, it is easy to favorably fuse-bond the skin material and the expanded bead molded article. In addition, when the mold temperature is 90° C. or lower, defects in appearance of the foamed molded article hardly occur and the cooling period can be suitably reduced, so that it is preferable from the viewpoint of productivity.

Next, a feeding hole on the skin material as so formed is created with a bead feeder, and polypropylene-based resin expanded beads are filled inside the skin material through the bead feeder. Then, a heating medium such as steam is supplied and discharged though a plurality of heating medium supply/discharge pins (steam pin) inserted into the skin material. This heats the expanded beads and causes the expanded beads to be fuse-bonded to one another to form an expanded bead molded article as well as the expanded bead molded article and the inner circumferential surface of the skin material are fuse-bonded.

It is preferable that the step of filling polypropylene-based resin expanded beads inside the skin material is carried out while the skin material is in a soft state before solidification. It is also preferable that what is called a compression filling process is adopted as the above step. The compression filling process is a filling process in which the pressure in a hollow molded body is adjusted to a certain level higher than atmospheric pressure, expanded beads compressed and pressurized beforehand by gas at a pressure higher than the pressure inside the hollow molded body are filling inside the hollow molded body, and the pressure inside the hollow molded body is then released after completion of the filling. Prior to the filling of the expanded beads, a heating medium supply/discharge pin(s) is made to penetrate through a wall portion of the skin material and is inserted into the skin material. Then, gas at a given pressure is supplied inside the skin material through the pin(s) and the gas is discharged, if appropriate. In this way, the pressure inside the hollow molded body can be adjusted.

After that, the split molds are opened to take out a molded product. Subsequently, burrs may be removed to obtain a skin-covered foamed molded article. Note that the above heating medium supply/discharge pin(s) means a pin(s) through which a heating medium such as steam can be supplied to the inside of the hollow molded body and through which a heating medium can be discharged from the inside of the hollow molded body.

FIG. 1 shows a skin-covered foamed molded article 100 manufactured by the above production method. FIG. 1 is a perspective view of the skin-covered foamed molded article 100 and a portion of a skin material 20 is not depicted so as to make the inside understandable. In addition, in FIG. 1, glass fiber included in the skin material 20 is also not depicted. As shown in FIG. 1, the skin-covered foamed molded article 100 includes a expanded bead molded article 10 with a prescribed shape and the skin material 20 that covers the expanded bead molded article 10. The expanded bead molded article 10 is formed by filling and heating expanded beads inside the skin material 20, which is a hollow molded body, so that the peeling strength (0.1 MPa or higher) specified in the invention is realized. The skin material 20 in the invention has an average wall thickness of from 1.0 mm to 5.0 mm. As a result, it is possible to form a desired shape along the inner side surface of a mold used during molding. This makes it possible to correspond to not only relatively simple shapes such as rectangular parallelepipeds as shown in FIG. 1 but also complex shapes (not shown). In addition, the expanded bead molded article 10 may be consisted of a complex shape bonded to the inner side surface of the skin material 20 with a complex shape, because the expanded bead molding 10 is formed by filling expanded beads inside the skin material 20 which is a hollow molded body formed as a complex shape.

EXAMPLES

Hereinafter, the present invention will be described in more detail based on Examples. However, the invention is not limited to these Examples. Note that Table 1 shows the specifics of raw materials A to D used for the skin material. Table 2 shows production conditions for skin-covered foamed molded articles (foamed molded articles).

Raw materials A to F, which were used for forming skin materials in Examples, and raw material G, which was expanded beads used for an expanded bead molded article, are as follows. Note that raw material F is a recovered raw material prepared by separating a skin material from the foamed molded article of Example 7 with the skin material formed using raw material E and by crushing the skin material with a single-screw high-speed shearing crusher.
Raw material A: glass fiber-reinforced polypropylene-based resin
Raw material B: glass fiber-reinforced polypropylene-based resin
Raw material C: polypropylene-based resin
Raw material D: polypropylene-based resin
Raw material E: glass fiber-reinforced polypropylene-based resin
Raw material F: glass fiber-reinforced polypropylene-based resin
Raw material G: polypropylene-based resin expanded beads [base resin: a propylene-ethylene random copolymer (with a melting point of 145° C. and ethylene content of 2.5 mass %) with an apparent density of 56 kg/m$^3$ and an average bead diameter of 2.8 mm]

Table 1 shows the specifics of the above raw materials A to F. In addition, Table 2 shows production conditions for respective Examples and Comparative Examples. Note that the glass fiber lengths and the densities of raw materials A to F designated in Table 1 are catalogue values, and the melting points, the flexural moduluses, the melt viscosities (Pa·s), and the melt elongation (m/min) are values determined as follows.

(Melting Point)

The melting points of raw materials A to F were measured based on heat-flux differential scanning calorimetry (DSC) according to JIS K7121-1987. A "case (2) For Measurement of Melting Temperature after a Definite Heat Treatment" was adopted as "Conditioning of Test Specimen". The rate of 10° C./min was used as both the rate of heating and the rate of cooling. The nitrogen influx was 30 mL/min. The peak top temperature of a melting peak on the resulting DSC curve was defined as a melting point.

(Flexural Modulus)

The flexural modulus of each of raw materials A to F was measured in accordance with JIS K7171-1994. For each of raw materials A to F, 5 samples that were used to measure a flexural modulus and had a length of 80 mm, a width of 10 mm, and a thickness of 4 mm were prepared by injection molding. Next, each sample was tested using an autograph tester (manufactured by Shimadzu Corporation) and the flexural modulus of each sample was measured under conditions at a span between specimen supports of 64 mm, an indenter radius (R1) of 2 mm, a supporting table radius (R2) of 2 mm, and a testing rate of 10 mm/min. The arithmetic mean of the flexural moduluses as obtained by the above measurement was calculated and defined as the flexural modulus (MPa) of each raw material and was listed in Table 1.

(Melt Viscosity)

An orifice with a nozzle diameter of 1 mm and a nozzle length of 10 mm was used and the melt viscosities of raw materials A to F were measured under conditions at a measurement temperature of 230° C. and a shear rate of 100 sec$^{-1}$. A CAPILOGRAPH 1D, manufactured by Toyo Seiki Seisaku-sho, Ltd., was used as a measuring device.

(Melt Elongation)

The melt elongations (m/min) of raw materials A to F were measured as follows. A CAPILOGRAPH 1D, manufactured by Toyo Seiki Seisaku-sho, Ltd., was used as a measuring device. A cylinder with a cylinder diameter of 9.55 mm and a length of 350 mm and an orifice with a nozzle diameter of 2.095 mm and a length of 8.0 mm were used. The orifice was placed in the cylinder and the preset temperature inside the cylinder was set to 190° C. About 15 g of each measurement sample was put into the cylinder and was left for 5 min. Then, the measurement sample was melted to prepare a molten resin. Next, the molten resin was extruded like a strand through the orifice at a piston descending speed of 10 ram/min. The strand-like material as so extruded was set on a pulley with a diameter of 45 mm. Then, a pulling roller was used to pull the strand-like material while a pulling speed was increased at a certain increasing rate such that the pulling speed reached 200 m/min from 0 m/min over 4 min. In this way, the pulling speed immediately before the strand-like material was ruptured was measured. This measurement was conducted on 10 different pieces of each measurement sample and the arithmetic mean was defined as a melt elongation.

Example 1

Raw materials A and C were used and dry-blended, such that the blending ratio was adjusted so as to have 10 mass % of glass fiber with respect to the total 100 mass % of raw materials A and C, to prepare a blended material. This blended material was fed to an extruder (L/D=28) with an inner diameter of 65 mm and kneaded at 215° C. to prepare a molten resin composition. The content of glass fiber is listed in Table 3.

Each molten resin composition was filled into an accumulator provided downstream of the extruder. At that time, the preset temperature of the accumulator was set to 215° C. The molten resin composition filled in the accumulator was extruded at a discharge rate of 600 kg/h from a circular die having a lip part with a diameter of 190 mm to form a parison. Next, the parison in a soft state was sandwiched between split molds that were arranged immediately below the die and had an approximately rectangular parallelepiped molding cavity with a length of 350 mm, a width of 260 mm, and a thickness of 25 mm. The preset temperature of the split molds was set to 60° C. After the molds were closed, a blow pin was inserted into the parison and the air pressurized at 0.50 MPa (G) was blown into the parison from the blow pin. Then, a hollow molded body (skin material) in which the shape of the above molding cavity was reflected was formed. Note that as the molds, molds in which one of the split molds had a bead feeder (with a diameter of 20 mmφ) and the total 8 steam pins arranged in 2 longitudinal columns and 4 lateral rows were used. The steam pins were pitched at 100 mm apart. Each steam pin had a diameter of 8 mmφ and had, on the lateral side, a slit for supplying and discharging steam.

Next, a bead feeder and eight steam pins were made to penetrate through a wall portion of the hollow molded body and to insert into the hollow molded body which was in a soft state. Then, gas was supplied and discharged through the steam pins to and from the inside of the hollow molded body. After that, while the pressure inside the hollow molded body was adjusted to 0.15 MPa (G), the hollow molded body was filled, through the bead feeder, with expanded beads compressed beforehand with the air pressurized at 0.20 MPa (G). The above raw material G was used as the expanded beads.

After the expanded beads were filled, while being sucked up through 4 steam pins A out of the 8 steam pins inserted into the hollow molded body, steam at 0.34 MPa (G) was supplied for 8 sec, through the rest 4 steam pins B, to the inside of the hollow molded body. Next, while being sucked up through the steam pins B, steam at 0.34 MPa (G) was supplied for 6 sec, through the steam pins A, to the inside of the hollow molded body. Then, steam at 0.34 MPa (G) was supplied for 5 sec, through all the steam pins, to the inside of the hollow molded body. This steam heating caused secondary expansion of the expanded beads, caused the expanded beads to be fuse-bonded to one another, and further caused the inner surface of the hollow molded body and the expanded bead molded article to be fuse-bonded to produce a foamed molded article. After the foamed molded article had been cooled, the bead feeder and the steam pins were removed from the foamed molded article. The molds were then opened and the foamed molded article with burrs was taken out. Finally, the foamed molded article, from which the unwanted burrs had been removed, was made as Example 1.

Example 2

A foamed molded article was produced as Example 2 in the same manner as in Example 1 except that the blending ratio between raw materials A and C were altered and the amount of glass fiber in the skin material was changed to 20 mass %.

Example 3

A foamed molded article was produced as Example 3 in the same manner as in Example 1 except that raw material D was used instead of raw material C.

Example 4

A foamed molded article was produced as Example 4 in the same manner as in Example 3 except that the blending ratio between raw materials A and D was altered and the amount of glass fiber in the skin material was changed to 20 mass %.

Example 5

Raw materials B and C were used and dry-blended, such that the blending ratio was adjusted so as to have 10 mass % of glass fiber with respect to the total 100 mass % of raw materials B and C, to prepare a blended material. Next, the blended material was put into a single-screw extruder with an inner diameter of 50 mm and was kneaded at 230° C. to prepare a molten resin composition. This molten resin composition was extruded like a strand and the strand was cut to give pellets.

The resulting pellets were dried and then fed into an extruder (L/D=28) with an inner diameter of 65 mm and kneaded at 225° C. to prepare a molten resin composition. A foamed molded article was produced as Example 5 in the same manner as in Example 1 except that this molten resin composition was filled in an accumulator adjusted at 225° C. Note that in Example 5, in order to make the fiber length of glass fiber in Example 5 somewhat shorter than that of glass fiber in Comparative Example 3, raw materials B and C were once kneaded with a single-screw extruder to produce a pellet and this pellet was re-kneaded with an extruder for forming a skin material.

Comparative Example 1

A foamed molded article was produced as Comparative Example 1 in the same manner as in Example 1 except that raw material A was not used and only raw material C was used as a raw material for the skin material and kneading was carried out at 210° C. to prepare a molten resin composition.

Comparative Example 2

A foamed molded article was produced as Comparative Example 2 in the same manner as in Comparative Example 1 except that raw material D was used, instead of raw material C, as a raw material for the skin material.

Comparative Example 3

Raw materials B and C were used and dry-blended, such that the blending ratio was adjusted so as to have 10 mass % of glass fiber with respect to the total 100 mass % of raw materials B and C, to prepare a blended material. Next, a foamed molded article was produced as Comparative Example 3 in the same manner as in Example 5 except that this blended material was fed into an extruder (L/D=28) with an inner diameter of 65 mm and kneading was carried out at 225° C. to prepare a molten resin composition.

Comparative Example 4

Raw materials A and C were used and dry-blended, such that the blending ratio was adjusted so as to have 10 mass % of glass fiber with respect to the total 100 mass % of raw materials A and C, to prepare a blended material. Next, the blended material was fed into a twin-screw extruder with an inner diameter of 25 mm and was kneaded at 230° C. to prepare a molten resin composition. This molten resin composition was extruded like a strand and the strand was cut to give pellets 1. The pellets 1 (first-time kneaded material) was dried and then fed into a twin-screw extruder with an inner diameter of 25 mm again to prepare pellets 2 (second-time kneaded material) in the same manner as described above. According to the description above, pellets 4 were prepared by kneading a total of four times with a twin-screw extruder, and a foamed molded article was as Comparative Example 4 in the same manner as in Example 1 except that pellets 4 was used. Note that in Comparative Example 4, raw materials A and C were dry-blended and then kneaded 4 times with a twin-screw extruder and as a result of which the fiber length of glass fiber included in the skin material was adjusted to be shorter than that of Example 1.

Example 6

Raw materials A and C were used and dry-blended, such that the blending ratio was adjusted so as to have 15 mass % of glass fiber with respect to the total 100 mass % of raw materials A and C, to prepare a blended material. This blended material was fed to an extruder (L/D=28) with an inner diameter of 120 mm and was kneaded at 215° C. to prepare a molten resin composition.

Each molten resin composition was filled into an accumulator provided downstream of the extruder. At that time, the preset temperature of the accumulator was set to 210° C. The molten resin composition filled in the accumulator was extruded at a discharge rate of 1200 kg/h from a circular die having a lip part with a diameter of 250 mm to form a parison. This parison in a soft state was sandwiched between split molds that were arranged immediately below the die and had an approximately long rectangular parallelepiped molding cavity with a length of 2070 mm, a width of 170 mm, and a thickness of 70 mm. The preset temperature of the split molds was set to 60° C. After the molds were closed, a blow pin was inserted into the parison and the air pressurized at 0.50 MPa (G) was blown into the parison from the blow pin. Then, a hollow molded body (skin material) in which the shape of the above molding cavity was reflected was formed. Note that as the molds, used were molds in which one of the split molds had a bead feeder (with a diameter of 20 mmφ) and the total 10 steam pins arranged like zigzag in a straight line direction. The steam pins were pitched at 250 mm apart. Each steam pin had a diameter of 8 mmφ and had, on the lateral side, a slit for supplying and discharging steam.

Next, a bead feeder and 10 steam pins were made to penetrate through a wall portion of the hollow molded body and to insert into the hollow molded body which was in a soft state. Then, gas was supplied and discharged through the steam pins to and from the inside of the hollow molded body. After that, while the pressure inside the hollow molded body was adjusted to 0.15 MPa (G), the hollow molded body was filled, through the bead feeder, with expanded beads compressed beforehand with the air pressurized at 0.20 MPa (G). The above raw material G was used as the expanded beads.

After the expanded beads were loaded, while being sucked up through 5 steam pins A out of the 10 steam pins inserted into the hollow molded body, steam at 0.40 MPa (G) was supplied for 10 sec, through the rest 5 steam pins B, to the inside of the hollow molded body. Next, while being sucked up through the steam pins B, steam at 0.40 MPa (G) was supplied for 8 sec, through the steam pins A, to the inside of the hollow molded body. Then, steam at 0.40 MPa (G) was supplied for 8 sec, through all the steam pins, to the inside of the hollow molded body. This steam heating caused secondary expansion of the expanded beads, caused the expanded beads to be fuse-bonded to one another, and further caused the inner side surface of the hollow molded body and the expanded bead molded article to be fuse-bonded to produce a foamed molded article. After the foamed molded article had been cooled, the bead feeder and the steam pins were removed from the foamed molded article. The molds were then opened and the foamed molded article with burrs was taken out. Finally, the foamed molded article, from which the unwanted burrs had been removed, was made as Example 6.

Examples 7 to 9

Foamed molded articles were produced as Examples 7 to 9 in the same manner as in Example 1 except that the skin material molding conditions were set to specifics designated in Table 2 and the amount of glass fiber included in each skin material was changed to a corresponding value indicated in Table 3.

Example 10

A foamed molded article was produced as Example 10 in the same manner as in Example 6 except that the skin material molding conditions were set to specifics designated in Table 2.

Comparative Example 5

A foamed molded article was produced as Comparative Example 5 in the same manner as in Example 6 except that raw material A was not used and only raw material C was used as a raw material for the skin material and kneading was carried out at 205° C. to prepare a molten resin.

Comparative Example 6

A foamed molded article was produced as Comparative Example 6 in the same manner as in Example 7 except that the skin material molding conditions were set to specifics designated in Table 2.

The foamed molded article of each of Examples and Comparative Examples as so obtained was measured and evaluated with respect to the following matters. The measured results and evaluation results were shown in Tables 2 to 5.

(Apparent Density of Expanded Beads)

The apparent density [kg/m$^3$] of expanded beads filled into each hollow molded body was measured as below and listed in Table 2. First, expanded beads were allowed to stand for 2 days under conditions at a relative humidity of 50%, a temperature of 23° C., and 1 atm. Next, a 200-mL measuring cylinder was set and 100 mL of water at a temperature of 23° C. was poured into the measuring cylinder. About 30 mL of expanded beads in a bulk volume (mass W1 of expanded beads) was submerged under water in the above measuring cylinder by using a metal net. Then, while the volume of the metal net was taken into account, the volume V1 [mL] of the expanded beads was measured by reading how much the water level was raised. This volume V1 was divided (V1/N) by the number (N) of the expanded beads put into the measuring cylinder to calculate the average volume per expanded bead. Subsequently, the diameter of virtual true sphere having the same volume as the average volume obtained was defined as the average particle size [mm] of the expanded beads. In addition, the mass W1 [g] of the expanded beads put into the measuring cylinder was divided (W1/V1) by the volume V1 and the unit was converted to give the apparent density [kg/m$^3$] of the expanded beads.

(Widthwise Expansion of Parison)

Parisons were formed under the same conditions as those for the respective Examples and Comparative Examples. A lower portion of each parison was pinched off. Next, compressed air at 0.15 MPa (G) was injected into the parison from a die side to expand the width of the parison. Then, the parison widthwise expansion was evaluated as follows. Table 2 shows the evaluation results. Note that the circumferential length of its lip portion was determined from the diameter of the lip part×π (the circular constant). In addition, a front image of the parison during widthwise expansion was video-taped to measure the maximum length in a direction perpendicular to the parison extrusion direction just before parison rapture. The maximum circumferential length of the parison was calculated from this maximum diameter×π.

A: There is no parison rapture when the blow ratio is 1.9.
B: There is parison rapture when the blow ratio is from 1.7 to less than 1.9.
C: There is parison rapture when the blow ratio is from 1.5 to less than 1.7.
D: There is parison rapture when the blow ratio is from 1.3 to less than 1.5.

(Hole Openability by Steam Pin)

Openability of a hole, which was created when each steam pin was inserted into a hollow molded body, by a steam pin, was evaluated as follows and was indicated in Table 2.

A: A hole is opened at every site and a slit of each steam pin was not occluded with a stretched resin.
B: Holes are unopened at some sites or a resin is stretched so as to occlude a slit of each steam pin.
D: No holes are opened at all the sites.

(Fiber Blending Amount)

The fiber blending amount (mass %) in each skin material designated in Table 3 was adjusted according to the raw material blending ratio as described above.

(Weight-average Fiber Length of Fiber)

The weight-average fiber length of glass fiber in each skin material was measured as follows.

First, the skin material was cut and separated from each foamed molded article obtained. Next, about 1 g of respective test pieces were excised from 5 sites randomly selected on the skin material. Then, all the test pieces were boiled in 200 mL of decahydronaphthalene to dissolve its polypropylene-based resin. In this state, filtration was carried out using a 400-mesh filter paper to collect only fiber. After that, a microscope was used to observe a 50× enlarged image of the fiber. The length of each of 100 fibers randomly selected from the observed image was measured. Each measured value (mm) (rounded to two digits after the decimal point) was used to determine the weight-average fiber length of the fiber by calculation based on the following Formula 1. Table 3 lists each determined value.

[Formula 1]

$$\text{Weight-average fiber length } L_w = \Sigma(N_i \times L_i^2)/\Sigma(N_i \times L_i) \quad (1)$$

where $L_i$ represents fiber length and $N_i$ represents the number of fibers.

(Density of Raw Material for Skin Material)

The densities (g/cm$^3$) of the glass fiber-reinforced polypropylene-based resin and the polypropylene-based resin constituting each skin material listed in Table 3 were used. From the densities of the raw materials and the blending ratio, the density of raw material for the skin material was calculated.

(Partial Heat of Fusion and Heat of Fusion Ratio)

The partial heat of fusion (J/g, 80° C. to 140° C.) in each skin material and the heat of fusion ratio (i.e., partial heat of fusion/total heat of fusion) were measured as follows. Specifically, in heat-flux differential scanning calorimetry, 3 to 5 mg of each test piece was excised from each skin material. Next, the test piece was heated from room temperature to 200° C. at a heating rate of 10° C./min and was then immediately cooled to 40° C. at a cooling rate of 10° C./min. Subsequently, from the DSC endothermic curve obtained by re-heating to 200° C. at a heating rate of 10° C./min, the partial heat of fusion (ΔHp) was determined as follows.

1. A straight line (α-β) was drawn that connected point α at 80° C. and point β, which corresponded to the fusion end temperature (Te), on the DSC endothermic curve.
2. Next, a straight line parallel to the graph ordinate was drawn from point σ at 140° C. on the DSC endothermic curve. Then, the point intersecting with the straight line (α-β) was defined as γ.
3. The partial heat of fusion (ΔHp) was calculated as a heat amount corresponding to the area of a section surrounded by the DSC curve, the line segment (σ-γ), and the line segment (γ-α). In addition, the total heat of fusion (ΔHt) was calculated as a heat amount corresponding to the area of a section surrounded by the DSC curve and the line segment (α-β). Then, the value for the partial heat of fusion was divided by the value for the total heat of fusion to calculate a heat of fusion ratio. Table 3 lists each calculated value.

(Average Wall Thickness of Skin Material)

The total three sites at a longitudinal middle portion and near both longitudinal end portions of each foamed molded article obtained were sliced in a direction perpendicular to the longitudinal direction. Then, on a cross-section of the skin material as seen in the cross-section (either one of two cross-sections) of each sample, six sites were selected with an equal interval along the circumferential direction of the skin material and the thickness of the skin material at each selected site was measured. Provided that the above six sites were chosen while avoiding insertion sites of the bead feeder and the steam pins for the foamed molded article. The thickness values at 18 sites measured were averaged by arithmetic mean to give the average wall thickness (mm) of the skin material. Table 3 lists each average wall thickness.

(Flexural Characteristics of Skin Material)

The flexural moduluses (MPa) in the longitudinal direction and in the lateral direction of each skin material were measured in accordance with JIS K7171-1994 as follows.

First, just skin material pieces were excised from randomly selected five sites at the surface on the side, where no steam pin insertion sites were formed, among the following plate surfaces of each foamed molded article obtained to give measurement samples.

The above plate surfaces regarding Examples 1 to 5 and 7 to 9 and Comparative Examples 1 to 4 and 6 are surfaces facing the surfaces of the molding cavity, with a length of 350 mm×a width of 260 mm, of the molds.

The above plate surfaces regarding Examples 6 and 10 and Comparative Example 5 are surfaces facing the surfaces of the molding cavity, with a length of 2070 mm×a width of 170 mm, of the molds.

The thickness of each measurement sample was set to the same as the thickness of each skin material. Then, the lengthwise direction of each measurement sample was made to correspond to the longitudinal direction of each skin material to prepare five samples 1 that had a length of 80 mm and a width of 10 mm and were used to measure the flexural modulus in the longitudinal direction. Likewise, the lengthwise direction of each measurement sample was made to correspond to the lateral direction of each skin material to prepare five samples 2 that had a length of 80 mm and a width of 10 mm and were used to measure the flexural modulus in the lateral direction. Next, each sample was tested using an autograph tester (manufactured by Shimadzu Corporation) and the flexural modulus of each sample was measured under conditions at an span between specimen supports of 64 mm, an indenter radius (R1) of 2 mm, a supporting table radius (R2) of 2 mm, and a testing rate of 10 mm/min. From the results of the above measurement, the arithmetic means of the respective flexural moduluses of samples 1 and 2 were calculated and defined as the flexural modulus (MPa) in the longitudinal direction and the flexural modulus (MPa) in the lateral direction of each skin material. Table 3 lists them. Table 3 also shows the ratio (longitudinal/lateral) of the flexural modulus in the longitudinal direction to the flexural modulus in the lateral direction.

(Parting Line Crack)

Appearance of each foamed molded article obtained was inspected. Then, the case where there was no occurrence of any parting line crack that was visually recognized on the outer surface of the visually inspected skin material was assessed as "A". The case where some site with a crack was found was assessed as "D". Table 3 shows the assessment results.

(Apparent Densities of Expanded bead Molded Article and Expanded bead Molded article Near to Steam Pin Insertion Site)

The apparent density [kg/m$^3$] of each expanded bead molded article was measured as follows and was designated as apparent density 1 in Table 3. First, the skin material was cut and separated from each foamed molded article obtained and each test piece consisting of the expanded bead molded article was prepared. The apparent density of the expanded bead molded article was calculated by dividing the mass [kg] of each test piece by the volume [m$^3$] of the test piece as determined by a submersion method.

In addition, the apparent density [kg/m$^3$] of a portion near each steam pin insertion site of each expanded bead molded article was measured as follows and was designated as apparent density 2 in Table 3. Eight test pieces were prepared from each expanded bead molded article by excising each piece with a length of 5 cm×a width of 3 cm×the thickness (as the same thickness of each test piece) while each steam pin insertion site was set as a center. The apparent density of a portion near each steam pin insertion site of each expanded bead molded article was calculated by dividing the mass [kg] of each test piece by the volume [m$^3$] of the test piece as determined by a submersion method. The arithmetic mean of the apparent densities of the respective test pieces was calculated and defined as apparent density 2.

(Percentage of Skin Material-included Fiber with Fiber Length of 0.4 mm or Longer)

The percentage (on the number basis) of fiber that was included in each skin material and had a fiber length of 0.4 mm or longer was measured as follows. The measurement results were designated as the percentages of fiber with a length of 0.4 mm or longer in Table 4.

First, skin material was cut and separated from each foamed molded article obtained and about 1 g of respective test pieces were excised from 5 sites randomly selected. Then, all the test pieces were boiled in 200 mL of decahydronaphthalene to dissolve a polypropylene-based resin constituting the skin material. Then, only fiber was collected through filtration using a 400-mesh filter paper. After that, a microscope was used to magnify a view 50 times and 100 fibers were randomly selected. Subsequently, the length of each fiber was measured and the percentage, on the number basis, of fiber with a fiber length of 0.4 mm or longer was determined.

(Orientation Angle of Fiber Included in Skin Material)

Orientation of fiber on the outer surface side:

The percentage (on the number basis %) of glass fiber oriented at an orientation angle in a range of 45 degrees or less with reference to an extrusion direction in in-plane directions of each skin material on the outer surface side was measured as follows. The measurement results were designated as the percentages of outer orientation ≤45 degrees in Table 4.

How the glass fiber was oriented in the skin material was examined using a micro focus X-ray CT system (inspeXio SMX-100CT, manufactured by Shimadzu Corporation). Specifically, skin material was cut and separated from each foamed molded article and 10-mm-square samples were excised from 5 sites randomly selected on the skin material. Each sample was subjected to CT scan every 10 μm in the wall thickness direction (in the depth direction) from the outer surface to obtain CT images. Note that the orientation angle of fiber means an angle of fiber with reference to a reference line and the reference line was a line along the extrusion direction of a parison used to form each skin material.

In the CT images (in a φ6-mm region) positioned at 10 μm in the depth direction from the outer surface, the number of glass fibers detected was counted and the orientation angle of every glass fiber was measured by using image processing software of the above CT system. Further, the CT images positioned at each of 20 μm, 30 μm, 40 μm, and 50 μm in the depth direction were subject to the same manipulation as above. Then, the number of glass fibers oriented at an orientation angle in a range to 45 degrees with reference to the reference line was divided by the total glass fiber count to determine the percentage (on the number basis %) of glass fiber oriented at an orientation angle in a range of 45 degrees or less with reference to the extrusion direction (reference line).

Orientation 1 of fiber at the middle portion:

The percentage (on the number basis %) of glass fiber oriented at an orientation angle in a range of from 0 degrees to 10 degrees with reference to the extrusion direction in in-plane directions of each skin material at the middle portion was measured as follows. The measurement results were designated as the percentages of middle orientation ≤10 degrees in Table 4.

The total glass fiber count and the orientation angle of the glass fiber were measured in the same manner as above except that each skin material was sliced at the wall thickness middle portion and the total 4 CT images were used, which positioned at 10 μm and 20 μm to the outer surface side of the skin material and positioned at 10 μm and 20 μm to the inner surface side of the skin material from the slice surface were used.

Then, the number of glass fibers oriented at an orientation angle in a range of from 0 degrees to 10 degrees with reference to the reference line was divided by the total glass fiber count to determine the percentage (on the number basis %) of glass fiber oriented at an orientation angle in a range of from 0 degrees to 10 degrees with reference to the extrusion direction (reference line).

Orientation 2 of fiber at the middle portion:

The percentage (on the number basis %) of glass fiber oriented at an orientation angle in a range of from more than 10 degrees to 45 degrees with reference to the extrusion direction in in-plane directions of each skin material at the middle portion was measured in the same manner as above. The measurement results were designated as the percentages of middle orientation 10 degrees < to 45 degrees in Table 4.

Orientation of fiber on the inner surface side:

The percentage (on the number basis %) of glass fiber oriented at an orientation angle in a range of 45 degrees or less with reference to the extrusion direction in in-plane directions of each skin material on the inner surface side was measured as follows. The measurement results were designated as the percentages of inner orientation ≤45 degrees in Table 4.

The percentage (on the number basis %) of glass fiber oriented at an orientation angle in a range of 45 degrees or less with reference to the extrusion direction (reference line) was determined in the same manner as above except that CT images were obtained by CT scanning every 10 μm in the wall thickness direction (in the depth direction) from the inner surface side of each skin material.

(Linear Expansion Coefficient)

The linear expansion coefficient of each foamed molded article in the longitudinal direction was measured as follows. The foamed molded article longitudinal linear expansion coefficient (/° C.) of each foamed molded article obtained was measured in a temperature range of from 23° C. to 80° C. Table 5 shows the measured results. Specifically, each foamed molded article was first placed for 48 h in a constant-temperature and constant-humidity chamber at 23° C. and a relative humidity of 50%, and the longitudinal size ($L_{23}$) of the foamed molded article in the constant-temperature chamber under the same conditions was measured. Next, the foamed molded article was placed for 2 h in an oven at 80° C. and a relative humidity of 50%, and the longitudinal size ($L_{80}$) of the foamed molded article immediately after collected from the oven was measured. Then, the linear expansion coefficient was calculated by using the following Formula 2:

[Formula 2]

$$(L_{80}-L_{23})/\{L_{23}\times(80-23)\} \quad (2).$$

(Peeling Strength)

The peeling strength between the skin material and the expanded bead molded article was measured as follows.

Rectangular parallelepiped-shaped test pieces (50 mm×50 mm×the thickness: the same thickness as that of each molded article) with skin materials on two surfaces were excised from 5 sites randomly selected on the plate surfaces of each skin-covered foamed molded article obtained. Next, the upper and lower surfaces (skin material surfaces) of each test piece were coated with an adhesive and were bonded to a jig for measuring a peeling strength. Then, the bonded test piece was subjected to a tensile test using a tensilon (universal tester) at a tensile rate of 2 ram/min. The maximum stress in the above tensile test was defined as a peeling strength (MPa) and listed in Table 5. As the universal tester, RTC-1250A, manufactured by ORIENTEC Co, LTD., was used.

(Longitudinal Shrinkage Ratio)

The maximum length (mold longitudinal size) $L_0$ of the molding cavity of the molds was measured. Each foamed molded article immediately after ejected from the molds was placed for 48 h under an atmosphere at 23° C. and a relative humidity of 50%. Subsequently, the size of a site corresponding to the above mold longitudinal size $L_0$ in the foamed molded article was measured to obtain the longitudinal size $L_1$ of the foamed molded article. Then, Table 5 shows the longitudinal shrinkage ratio (%) calculated by the following Formula 3:

[Formula 3]

$$\text{Longitudinal shrinkage ratio }(\%)=(L_0-L_1)/L_0\times100 \quad (3).$$

(Mass)

The overall mass (g) of each resulting foamed molded article after placed for 48 h in a constant-temperature and constant-humidity chamber at 23° C. and a relative humidity of 50% was measured and listed in Table 5.

(Flexural Characteristics of Skin-Covered Foamed Molded Article)

The Flexural modulus (MPa), 5-mm deflection load (N), flexural strength (MPa), and amount of deflection (mm) at maximum load of each skin-covered foamed molded article were measured in accordance with JIS K7171-1994 as follows.

First, five skin-covered foamed molded articles were prepared as samples. Next, each sample was used in an autograph tester (manufactured by Shimadzu Corporation). Specifically, each sample at or near the longitudinal middle portion of its plate surface was depressed by an indenter under conditions at a span between specimen supports of 300 mm, an indenter radius R1 of 25 mm, a supporting table radius R2 of 5 mm, and a testing rate of 20 ram/min. This caused each sample to be bent and the flexural modulus of the sample was measured. Then, the arithmetic mean of the respective flexural moduluses was calculated. This arithmetic mean was defined as the flexural modulus (MPa) of each skin-covered foamed molded article and listed in Table 5. Likewise, the 5-mm deflection load (N), which is a load when a sample is deflected by 5 mm, the flexural strength (MPa), and the amount of deflection at maximum load (mm) were determined and listed in Table 5.

(Specific Flexural Modulus)

The specific flexural modulus (MPa/g) was calculated by dividing the longitudinal flexural modulus (MPa) of each foamed molded article as so measured by the mass of the foamed molded article as so measured and listed in Table 5.

(Surface Property Evaluation 1)

The surface of each foamed molded article obtained was visually inspected and its surface property was evaluated as follows. Table 5 shows the evaluation results.

A: No fine splits due to glass fiber were found on the surface of a foamed molded article.

D: fine splits due to glass fiber were found on the surface of a foamed molded article.

(Surface Property Evaluation 2)

A surface property of each foamed molded article obtained was evaluated using surface roughness Rz as an indicator as follows. First, test pieces with a thickness of 20 mm while the skin material was left on one surface side were excised from 5 sites randomly selected on the plate surfaces of each foamed molded article. A surfcorder SE1700α, manufactured by Kosaka Laboratory Ltd., was used as a measuring device. Each test piece was allowed to stand on a leveled stand while the skin material side was the upper surface. Then, a tip of probe with a tip curvature radius of 2 μm was made to contact a surface (a surface of the skin material) of each test piece and the probe was displaced at 0.5 mm/s along the extrusion direction of the skin material so as to measure the surface roughness (maximum height Rz). Note that the cut-off value was set to 8 mm and the measurement length specified by the probe displacement distance was set to 20 mm. The other parameters were conformed to JIS B0601:2001 and the maximum height Rz (μm) of profile was determined. The determined maximum height Rz (μm) was used to evaluate the surface roughness as follows.

A: the maximum height Rz is less than 40 μm.
B: the maximum height Rz is from 40 μm to 60 μm.
D: the maximum height Rz exceeds 60 μm.

Note that various respective measurement procedures and evaluation protocols related to the Examples are used as reference for the measurement procedures and evaluation protocols for foamed molded articles of the invention and the respective configurations of the foamed molded articles.

TABLE 1

| Raw Material | Trade Name | Grade | Manufacturer | Structure (Glass Fiber Content) | Glass Fiber Length mm | Density g/cm³ | Melting Point °C. | Flexural Modulus MPa | Melt Viscosity (230° C.) Pa·s | Melt Elongation Rate (190° C.) m/min |
|---|---|---|---|---|---|---|---|---|---|---|
| A | PRIME POLYPRO | R-300G | PRIME POLYMER, Inc. | Glass Fiber-reinforced Polypropylene-based Resin (30 mass %) | 1.3 | 1.12 | 166 | 6540 | 720 | N.D. (Not Determined) |
| B | MOSDIO | L-3040P | PRIME POLYMER, Inc. | Glass Fiber-reinforced Polypropylene-based Resin (30 mass %) | 8.0 | 1.12 | 165 | 6900 | 1200 | N.D. |
| C | NOVATEC PP | EG8B | Japan Polypropylene Corporation | Polypropylene-based Resin | — | 0.90 | 145 | 950 | 1070 | 130 |
| D | NOVATEC PP | EC9 | Japan Polypropylene Corporation | Polypropylene-based Resin | — | 0.90 | 160 | 1050 | 1200 | 80 |
| E | — | — | — | Glass Fiber-reinforced Polypropylene-based Resin (15 mass %) | 0.8 | 1.00 | 163 | 2550 | 1190 | N.D. |
| F | — | — | — | Glass Fiber-reinforced Polypropylene-based Resin (15 mass %) | 0.3 | 1.00 | 162 | 2100 | 1000 | N.D. |

*F is a recovered raw material of E

TABLE 2

| | Molding Conditions for Skin Material | | | | Molding Conditions for Expanded bead Molded Article | | | | |
|---|---|---|---|---|---|---|---|---|---|
| No. | Raw Material Blending Ratio | Die Lip Clearance mm | Die Temperature °C. | Mold Temperature °C. | Expanded beads Apparent Density kg/m³ | Compression filling Pressure MPa (G) | Steam Pressure MPa (G) | Parison Widthwise Expansion | Hole Openability by Steam Pin |
| Example 1 | A:C = 1:2 | 4.5 | 215 | 60 | 56 | 0.15 | 0.34 | B | A |
| Example 2 | A:C = 2:1 | 4.5 | 215 | 60 | 56 | 0.15 | 0.34 | B | A |
| Example 3 | A:D = 1:2 | 4.3 | 215 | 60 | 56 | 0.15 | 0.34 | C | A |
| Example 4 | A:D = 2:1 | 4.3 | 215 | 60 | 56 | 0.15 | 0.34 | C | A |
| Example 5 | B:C = 1:2 | 5.2 | 225 | 60 | 56 | 0.15 | 0.34 | B | A |
| Comparative Example 1 | C | 3.3 | 210 | 60 | 56 | 0.15 | 0.32 | A | A |
| Comparative Example 2 | D | 3.3 | 210 | 60 | 56 | 0.15 | 0.32 | B | A |
| Comparative Example 3 | B:C = 1:2 | 5.5 | 225 | 60 | 56 | 0.15 | 0.34 | D | B |
| Comparative Example 4 | A:C = 1:2 | 4.8 | 215 | 60 | 56 | 0.15 | 0.34 | A | A |
| Example 7 | E | 4.1 | 215 | 60 | 56 | 0.15 | 0.34 | B | A |
| Example 8 | E:F = 1:1 | 4.1 | 205 | 60 | 56 | 0.15 | 0.34 | B | A |

TABLE 2-continued

| | Molding Conditions for Skin Material | | | | Molding Conditions for Expanded bead Molded Article | | | | |
|---|---|---|---|---|---|---|---|---|---|
| No. | Raw Material Blending Ratio | Die Lip Clearance mm | Die Temperature °C. | Mold Temperature °C. | Expanded beads Apparent Density kg/m³ | Compression filling Pressure MPa (G) | Steam Pressure MPa (G) | Parison Widthwise Expansion | Hole Openability by Steam Pin |
| Example 9 | B:D = 1:1 | 4.8 | 215 | 60 | 56 | 0.15 | 0.34 | B | A |
| Comparative Example 6 | E | 7.0 | 215 | 60 | 56 | 0.15 | 0.34 | B | A |
| Example 6 | A:C = 1:1 | 4.6 | 215 | 60 | 56 | 0.15 | 0.40 | B | A |
| Example 10 | E | 4.6 | 215 | 60 | 56 | 0.15 | 0.40 | B | A |
| Comparative Example 5 | C | 3.5 | 205 | 60 | 56 | 0.15 | 0.38 | A | A |

TABLE 3

| | Skin Material | | | | | | | | | Expanded bead Molded Article | |
|---|---|---|---|---|---|---|---|---|---|---|---|
| | Fiber Content mass % | Weight-average Fiber Length mm | Density g/cm³ | Partial Heat of Fusion J/g | Heat of Fusion Ratio | Average Wall Thickness mm | Flexural Modulus MPa | | | Parting Line Crack | Apparent Density 1 kg/m³ | Apparent Density 2 kg/m³ |
| No. | | | | | | | Longitudinal Direction | Lateral Direction | Longitudinal/ Lateral | | | |
| Example 1 | 10 | 0.8 | 0.97 | 33 | 0.44 | 2.5 | 1600 | 1230 | 1.3 | A | 45 | 47 |
| Example 2 | 20 | 0.8 | 1.05 | 33 | 0.44 | 2.5 | 2800 | 1300 | 2.2 | A | 45 | 45 |
| Example 3 | 10 | 0.8 | 0.97 | 11 | 0.14 | 2.5 | 1700 | 1250 | 1.4 | A | 45 | 47 |
| Example 4 | 20 | 0.8 | 1.05 | 11 | 0.14 | 2.5 | 2900 | 1300 | 2.2 | A | 45 | 46 |
| Example 5 | 10 | 1.1 | 0.97 | 29 | 0.41 | 2.5 | 1550 | 1200 | 1.3 | A | 45 | 47 |
| Comparative Example 1 | 0 | — | 0.90 | 40 | 0.56 | 2.5 | 850 | 830 | 1.0 | A | 45 | 47 |
| Comparative Example 2 | 0 | — | 0.90 | 14 | 0.16 | 2.5 | 920 | 900 | 1.0 | A | 45 | 47 |
| Comparative Example 3 | 10 | 1.7 | 0.97 | 31 | 0.42 | 2.5 | 1620 | 1200 | 1.4 | D | 43 | 40 |
| Comparative Example 4 | 10 | 0.3 | 0.97 | 29 | 0.42 | 2.5 | 1250 | 1200 | 1.0 | A | 45 | 47 |
| Example 7 | 15 | 0.8 | 1.00 | 11 | 0.15 | 2.5 | 2500 | 1350 | 1.9 | A | 45 | 47 |
| Example 8 | 15 | 0.5 | 1.00 | 11 | 0.15 | 2.5 | 2200 | 1300 | 1.7 | A | 45 | 47 |
| Example 9 | 15 | 1.1 | 1.01 | 10 | 0.11 | 2.5 | 2300 | 1400 | 1.6 | A | 45 | 47 |
| Comparative Example 6 | 15 | 0.8 | 1.00 | 11 | 0.15 | 2.5 | 2100 | 1300 | 1.6 | D | 45 | 47 |
| Example 6 | 15 | 0.8 | 1.01 | 33 | 0.44 | 2.5 | 2200 | 1300 | 1.7 | A | 45 | 47 |
| Example 10 | 15 | 0.8 | 1.00 | 11 | 0.15 | 2.5 | 2600 | 1350 | 1.9 | A | 45 | 47 |
| Comparative Example 5 | 0 | — | 0.90 | 40 | 0.56 | 2.5 | 850 | 830 | 1.0 | A | 45 | 47 |

TABLE 4

| | Skin Material | | | | |
|---|---|---|---|---|---|
| No. | Percentage of Fiber with Length of 0.4 mm or Longer % | Percentage of Outer Orientation ≤45 Degrees % | Percentage of Middle Orientation ≤10 Degrees % | Percentage of Middle Orientation 10 degrees < to 45 degrees % | Percentage of Inner Orientation ≤45 Degrees % |
| Example 1 | 60 | 94 | 51 | 33 | 89 |
| Example 2 | 65 | 93 | 48 | 37 | 88 |
| Example 3 | 62 | 95 | 53 | 32 | 90 |

TABLE 4-continued

| | Skin Material | | | | |
|---|---|---|---|---|---|
| No. | Percentage of Fiber with Length of 0.4 mm or Longer % | Percentage of Outer Orientation ≤45 Degrees % | Percentage of Middle Orientation ≤10 Degrees % | Percentage of Middle Orientation 10 degrees < to 45 degrees % | Percentage of Inner Orientation ≤45 Degrees % |
| Example 4 | 66 | 94 | 49 | 34 | 89 |
| Example 5 | 85 | 90 | 48 | 39 | 86 |
| Comparative Example 1 | — | — | — | — | — |
| Comparative Example 2 | — | — | — | — | — |
| Comparative Example 3 | 90 | 69 | 14 | 45 | 54 |
| Comparative Example 4 | 17 | 82 | 25 | 37 | 78 |
| Example 7 | 62 | 95 | 54 | 32 | 90 |
| Example 8 | 32 | 96 | 57 | 31 | 91 |
| Example 9 | 88 | 89 | 50 | 45 | 87 |
| Comparative Example 6 | 62 | 81 | 10 | 25 | 76 |
| Example 6 | 59 | 96 | 68 | 19 | 93 |
| Example 10 | 58 | 98 | 73 | 16 | 96 |
| Comparative Example 5 | — | — | — | — | — |

TABLE 5

| | Skin-covered foamed molded article | | | | | | | | | | |
|---|---|---|---|---|---|---|---|---|---|---|---|
| No. | Linear Expansion Coefficient/° C. | Peeling Strength MPa | Longitudinal Contraction % | Mass g | Flexural Modulus MPa | Specific Flexural Modulus MPa/g | 5-mm Deflection Load N | Flexural Strength MPa | Amount of Deflection at Maximum Load mm | Surface Property Evaluation 1 | Surface Property Evaluation 2 |
| Example 1 | $5.0 \times 10^{-5}$ | 0.52 | 0.4 | 570 | 480 | 0.84 | 840 | 8.7 | 18.5 | A | A |
| Example 2 | $4.0 \times 10^{-5}$ | 0.41 | 0.4 | 610 | 580 | 0.95 | 1200 | 10.4 | 21.0 | A | B |
| Example 3 | $5.0 \times 10^{-5}$ | 0.30 | 0.4 | 570 | 470 | 0.82 | 820 | 8.5 | 17.5 | A | A |
| Example 4 | $4.0 \times 10^{-5}$ | 0.22 | 0.4 | 610 | 570 | 0.93 | 1170 | 10.3 | 20.0 | A | B |
| Example 5 | $4.5 \times 10^{-5}$ | 0.42 | 0.5 | 570 | 440 | 0.77 | 780 | 7.4 | 19.0 | A | A |
| Comparative Example 1 | $11 \times 10^{-5}$ | 0.60 | 1.4 | 540 | 260 | 0.48 | 530 | 5.8 | 18.5 | A | A |
| Comparative Example 2 | $10 \times 10^{-5}$ | 0.34 | 1.2 | 540 | 310 | 0.57 | 600 | 6.4 | 19.0 | A | A |
| Comparative Example 3 | $8.0 \times 10^{-5}$ | 0.40 | 0.4 | 570 | 480 | 0.84 | 840 | 8.8 | 20.0 | D | D |
| Comparative Example 4 | $9.0 \times 10^{-5}$ | 0.51 | 0.9 | 570 | 330 | 0.58 | 630 | 6.6 | 18.0 | A | A |
| Example 7 | $4.5 \times 10^{-5}$ | 0.25 | 0.4 | 590 | 520 | 0.88 | 1240 | 9.3 | 17.0 | A | B |
| Example 8 | $4.5 \times 10^{-5}$ | 0.26 | 0.4 | 590 | 490 | 0.83 | 1140 | 8.8 | 18.0 | A | A |
| Example 9 | $4.5 \times 10^{-5}$ | 0.24 | 0.4 | 590 | 520 | 0.88 | 1260 | 9.2 | 16.5 | A | B |
| Comparative Example 6 | $8.0 \times 10^{-5}$ | 0.10 | 0.5 | 590 | 470 | 0.80 | 1080 | 7.5 | 13.5 | A | D |
| Example 6 | $5.0 \times 10^{-5}$ | 0.40 | 0.4 | 3570 | 70 | 0.020 | 1000 | 6.0 | 45.0 | A | B |
| Example 10 | $4.5 \times 10^{-5}$ | 0.24 | 0.4 | 3570 | 90 | 0.025 | 1150 | 6.5 | 40.0 | A | B |
| Comparative Example 5 | $11 \times 10^{-5}$ | 0.52 | 1.4 | 3290 | 40 | 0.012 | 590 | 3.8 | 47.0 | A | A |

The above embodiments encompass the following technical ideas.

(1) A skin-covered foamed molded article including: a skin material composed of a hollow molded body produced by blow-molding an extruded parison; and a expanded bead molded article located inside the skin material, the skin material and the expanded bead molded article being fuse-bonded,
wherein
the skin material has an average wall thickness of from 1.0 mm to 5.0 mm, the skin material includes a glass fiber-reinforced polypropylene-based resin including glass fiber in a range of from 5 mass % to 30 mass %, the glass fiber has a weight-average fiber length of from 0.4 mm to 1.5 mm, the expanded bead molded article includes a polypropylene-based resin, a peeling strength between the skin material and the expanded bead molded article is 0.1 MPa or higher, and a longitudinal linear expansion coefficient of the skin-covered foamed molded article at from 23° C. to 80° C. is $7 \times 10^{-5}$/° C. or lower.

(2) The skin-covered foamed molded article according to (1), wherein the skin material includes the glass fiber-reinforced polypropylene-based resin including the glass fiber in a range of from 12 mass % to 25 mass %.

(3) The skin-covered foamed molded article according to (1) or (2), wherein a percentage of glass fiber oriented at an orientation angle in a range of between ±45 degrees in an extrusion direction in in-plane directions of the skin material, with respect to the glass fiber present on an inner surface side of the skin material is 80% or higher on a number basis.

(4) The skin-covered foamed molded article according to any one of (1) to (3), wherein a percentage of glass fiber oriented at an orientation angle in a range of between ±45 degrees in an extrusion direction in in-plane directions of the skin material, with respect to the glass fiber present on an outer surface side of the skin material is 80% or higher on a number basis.

(5) The skin-covered foamed molded article according to any one of (1) to (4), wherein a percentage I of glass fiber oriented at an orientation angle in a range of between ±10 degrees in an extrusion direction in in-plane directions of the skin material is 40% or higher on a number basis and a percentage II of glass fiber oriented at an orientation angle in a range of more than +10 degrees in the extrusion direction and +45 degrees or less in the extrusion direction and less than −10 degrees in the extrusion direction and −45 degrees or more in the extrusion direction is from 20% to 50% on a number basis, with respect to the glass fiber present at a middle portion in a wall thickness direction of the skin material, and a sum of the percentages I and II is 80% or higher.

(6) The skin-covered foamed molded article according to any one of (1) to (5), wherein an apparent density of the expanded bead molding is from 20 kg/m$^3$ to 60 kg/m$^3$.

The present application claims priority based on Japanese Patent Application No. 2017-183754, filed on Sep. 25, 2017, and the disclosure is herein incorporated in its entirety.

REFERENCE SINGS LIST

10 Expanded bead molded article
20 Skin material
100 Skin-covered foamed molded article (Foamed molded article)

The invention claimed is:

1. A skin-covered foamed molded article comprising: a skin material composed of a hollow molded body produced by blow-molding an extruded parison; and an expanded bead molded article located inside the skin material, the skin material and the expanded bead molded article being fuse-bonded, wherein the skin material has an average wall thickness of from 1.0 mm to 5.0 mm, the skin material comprises a glass fiber-reinforced polypropylene-based resin containing glass fiber in a range of from 5 mass % to 30 mass %, the glass fiber has a weight-average fiber length of from 0.4 mm to 1.5 mm, the expanded bead molded article comprises a polypropylene-based resin, a peeling strength between the skin material and the expanded bead molded article is 0.1 MPa or higher, and a longitudinal linear expansion coefficient of the skin-covered foamed molded article at from 23° C. to 80° C. is $7\times10^{-5}$/° C. or lower, and wherein a percentage I of glass fiber oriented at an orientation angle in a range of 10 degrees or less with reference to an extrusion direction in in-plane directions of the skin material is 40% or higher on a number basis and a percentage II of glass fiber oriented at an orientation angle in a range of more than 10 degrees and 45 degrees or less in the extrusion direction is from 20% to 50% on a number basis, with respect to the glass fiber present at a middle portion in a wall thickness direction of the skin material, and a sum of the percentages I and II is 80% or higher.

2. The skin-covered foamed molded article according to claim 1, wherein the skin material comprises the glass fiber-reinforced polypropylene-based resin containing the glass fiber in a range of from 12 mass % to 25 mass %.

3. The skin-covered foamed molded article according to claim 1, wherein a percentage of glass fiber oriented at an orientation angle in a range of 45 degrees or less with reference to an extrusion direction in in-plane directions of the skin material, with respect to the glass fiber present on an inner surface side of the skin material is 80% or higher on a number basis.

4. The skin-covered foamed molded article according to claim 1, wherein a percentage of glass fiber oriented at an orientation angle in a range of 45 degrees or less with reference to an extrusion direction in in-plane directions of the skin material, with respect to the glass fiber present on an outer surface side of the skin material is 80% or higher on a number basis.

5. The skin-covered foamed molded article according to claim 1, wherein an apparent density of the expanded bead molded article is from 20 kg/m$^3$ to 60 kg/m$^3$.

* * * * *